(12) United States Patent
Mizutani et al.

(10) Patent No.: US 7,958,960 B2
(45) Date of Patent: Jun. 14, 2011

(54) DRIVING FORCE CONTROL APPARATUS FOR A VEHICLE THAT DRIVES WHEEL UNITS INDEPENDENTLY

(75) Inventors: Ryoji Mizutani, Nishikamo-gun (JP); Michitaka Tsuchida, Susono (JP); Tomohiro Fukushima, Kariya (JP); Masafumi Sakuma, Chiryu (JP)

(73) Assignees: Toyota Jidosha Kabushiki Kaisha, Aichi-Ken (JP); Aisin Seiki Kabushiki Kaisha, Aichi-ken (JP)

( * ) Notice: Subject to any disclaimer, the term of this patent is extended or adjusted under 35 U.S.C. 154(b) by 151 days.

(21) Appl. No.: 12/095,417

(22) PCT Filed: Nov. 29, 2006

(86) PCT No.: PCT/JP2006/324323
§ 371 (c)(1),
(2), (4) Date: May 29, 2008

(87) PCT Pub. No.: WO2007/064025
PCT Pub. Date: Jun. 7, 2007

(65) Prior Publication Data
US 2010/0004090 A1 Jan. 7, 2010

(30) Foreign Application Priority Data
Nov. 30, 2005 (JP) ................................. 2005-345033

(51) Int. Cl.
*B60K 1/02* (2006.01)
(52) U.S. Cl. .............. 180/65.51; 180/65.285; 180/65.31
(58) Field of Classification Search ...... 180/65.1–65.29, 180/65.51
See application file for complete search history.

(56) References Cited

U.S. PATENT DOCUMENTS

| 5,103,923 A | 4/1992 | Johnston et al. |
| 5,343,971 A | 9/1994 | Heidelberg et al. |
| 5,453,930 A * | 9/1995 | Imaseki et al. .................. 701/22 |
| 5,788,003 A | 8/1998 | Spiers |
| 5,915,488 A * | 6/1999 | Fliege .......................... 180/65.22 |
| 6,622,804 B2 * | 9/2003 | Schmitz et al. .......... 180/65.245 |
| 7,195,087 B2 * | 3/2007 | Hatsuda et al. .......... 180/65.285 |
| 2009/0178876 A1 * | 7/2009 | Miki et al. ..................... 180/411 |

FOREIGN PATENT DOCUMENTS

| DE | 4011291 A1 | 10/1991 |
| DE | 41 33 060 A1 | 4/1993 |
| JP | 02-133005 A | 5/1990 |

(Continued)

*Primary Examiner* — Jeffrey J Restifo
*Assistant Examiner* — Erez Gurari
(74) *Attorney, Agent, or Firm* — Sughrue Mion, PLLC

(57) ABSTRACT

Right front wheel units (FL, FR) are driven independently by motor generators (MGL, MGR). A power control unit (1) is provided common to the motor generators (MGL, MGR) and integrally controls driving them. Each motor generator (MGL, MGR) and the power control unit (1) are selectively connected by switch circuits (SWL, SWR). The switch circuits (SWL, SWR) are switched by an ECU (3), as appropriate, in accordance with how the vehicle (100) is currently traveling (i.e., a driving force that the vehicle is required to output, and a direction in which the vehicle is traveling). In other words, the vehicle (100) can selectively implement traveling with the left and right front wheel units (FL, FR) both serving as driving wheel units, and traveling with only one of the left and right front wheel units (FL, FR) serving as a driving wheel unit, depending on how the vehicle is currently traveling.

7 Claims, 7 Drawing Sheets

FOREIGN PATENT DOCUMENTS

| | | |
|---|---|---|
| JP | 04-145810 A | 5/1992 |
| JP | 09-093714 A | 4/1997 |
| JP | 2001-028804 A | 1/2001 |
| JP | 2001-078303 A | 3/2001 |
| JP | 2004-175313 A | 6/2004 |
| JP | 2004-328991 A | 11/2004 |
| JP | 2005-119647 A | 5/2005 |
| JP | 2005-151691 A | 6/2005 |
| RU | 2070857 C1 | 12/1996 |

* cited by examiner

DRIVING FORCE CONTROL APPARATUS FOR A VEHICLE THAT DRIVES WHEEL UNITS INDEPENDENTLY

TECHNICAL FIELD

The present invention relates to a driving force control apparatus for a vehicle that drives wheel units independently by individual driving sources, and particularly to a driving force control apparatus for a vehicle that drives wheel units independently that can drive a plurality of driving sources by a common drive circuit.

BACKGROUND ART

In recent years, hybrid vehicles and electric vehicles are gaining attention as environmentally friendly vehicles. A hybrid vehicle has, as a source of motive force, a conventional engine and in addition thereto a motor driven by a direct current power supply via an inverter. More specifically, the engine is driven to obtain a source of motive force and the direct current power supply also provides direct current voltage which is in turn converted by the inverter to alternate current voltage employed to rotate the motor to obtain a source of motive force.

An electric vehicle is a vehicle having as a source of motive force a motor driven by a direct current power supply via an inverter.

For hybrid vehicles and electric vehicles, a vehicle has been studied that drives right and left drive wheel units independently by individual motors or similar driving sources to drive wheel units independently. (See for example Japanese Patent Laying-Open Nos. 2001-28804, 2004-328991, 2001-78303, 2005-119647, 2-133005, 2004-175313, and 4-145810). It can provide enhanced driving force in comparison with an electric vehicle mounting only a single motor as a driving source, and also implement a delicate operation satisfying a request of a driver of a four wheel drive vehicle.

For example, Japanese Patent Laying-Open No. 2001-28804 discloses an electric vehicle having mounted therein a plurality of induction motors coupled with right and left drive wheel units to drive the drive wheel units, respectively, independently. Originally, an inverter is connected for each induction motor. According to the publication, such inverters are integrated into a single inverter to reduce the vehicle's weight and cost.

Herein if the right and left induction motors are driven by the common inverter, and the vehicle turns and has the right and left induction motors rotating at different speeds, the difference in rotational speed causes a difference between torques output, and the vehicle's cornering ability is impaired.

More specifically, an induction motor has a characteristic providing an output torque varying with slip velocity, which corresponds to a rotor's rotational speed minus a drive current's rotational speed. Thus when a vehicle turns, it has an outer wheel unit rotating at a speed higher than an inner wheel unit, and accordingly, the outer wheel unit's slip velocity becomes smaller than the inner wheel unit's slip velocity, and an induction motor that drives the inner wheel unit will thus output a larger torque than that which drives the outer wheel unit. As a result the vehicle's cornering ability is impaired.

Accordingly, Japanese Patent Laying-Open No. 2001-28804 adopts a configuration that controls slip velocity in accordance with a difference in rotational speed between the right and left induction motors to allow the induction motors to generate equal torques. Thus, when the vehicle is turning, the induction motor rotating at low speed can output a torque without increasing it. The vehicle can thus turn effectively smoothly.

Furthermore, Japanese Patent Laying-Open No. 2001-28804 describes that when the vehicle is traveling straight forward the right and left induction motors are compared in rotational speed, and when the induction motors are controlled in a powering mode the smaller rotational speed is set as a reference rotational speed, and when the induction motors are controlled in a regeneration mode, the larger rotational speed is set as a reference rotational speed, and in this way, vector control is performed. According to this, when the vehicle is traveling straight forward, and if it has a wheel unit slipping or skidding, a torque that is allocated to the slipping or skidding wheel unit can be reduced, and the motors can be controlled to eliminate slipping or skidding.

According to Japanese Patent Laying-Open No. 2001-28804, when the vehicle is traveling straight forward, the vector control can be performed to operate the induction motors in a range allowing the motors to be driven highly efficiently. However, when right and left drive motors rotate at the same speed, then the right and left induction motors will be controlled to be driven to output a target torque calculated from an accelerator pedal position, a shift position and the vehicle's speed, that is halved. As seen from the individual induction motors, this does not necessarily drive them highly efficiently. More specifically, a motor has a characteristic in efficiency that generally varies with the torque output and the number of revolutions. However, the torque output is balanced constantly at the right and left induction motors regardless of the torque output and the number of revolutions, and the induction motors may be driven less efficiently.

Accordingly, if a single inverter is used in driving a plurality of induction motors, reflecting the individual induction motors' respective drive efficiencies in allocating among the induction motors a driving force output from the induction motors would contribute to providing a vehicle reduced in weight and cost and also allow the vehicle to have the motors driven more efficiently as seen in total.

Furthermore, when a vehicle is turning, allocating a driving force output from the induction motors among the induction motors in accordance with in which direction the vehicle is turning, would also be effective in ensuring that the vehicle can travel safely.

The present invention has been made to overcome such disadvantage, and it contemplates a driving force control apparatus for a vehicle that drives wheel units independently, that can accomplish high drive efficiency and high traveling stability.

DISCLOSURE OF THE INVENTION

The present invention provides a driving force control apparatus for a vehicle that drives wheel units independently, including: n motor generators each coupled with a drive wheel unit and drivable independently from each other, n being a natural number of at least two; a drive circuit provided common to said n motor generators and configured to receive electric power from a power supply to drive said n motor generators; and a switch mechanism for selectively switching a state with one of said n motor generators and said drive circuit connected together and a state with m of said n motor generators and said drive circuit connected together, m being a natural number of at least two and at most n.

The present driving force control apparatus that adopts a configuration driving a plurality of motor generators by a common drive circuit can be reduced in size and weight, and cost. Furthermore, of the plurality of motor generators, one or at least two motor generators can be selected, as appropriate, as a motor generator(s) serving as a source(s) of driving force.

The present invention provides a driving force control apparatus for a vehicle that drives wheel units independently, including: n motor generators each coupled with a drive wheel unit and drivable independently from each other, n being a natural number of at least two; a drive circuit provided common to said n motor generators and configured to receive electric power from a power supply to drive said n motor generators; and a control device controlling said drive circuit in accordance with how a vehicle is currently traveling. The control device includes: first drive means for driving m of said n motor generators by said drive circuit, m being a natural number of at least two and at most n; and second drive means for driving one of said n motor generators by said drive circuit.

The present driving force control apparatus that adopts a configuration driving a plurality of motor generators by a common drive circuit can be reduced in size and weight, and cost. Furthermore, of the plurality of motor generators, one or at least two motor generators can be selected, as appropriate, as a motor generator(s) serving as a source(s) of driving force. Thus, whether the vehicle may be required to output large or small driving force, the selected motor generator(s) can be driven highly efficiently. As a result, the motor generators' total drive efficiency can be improved.

The present invention provides a driving force control apparatus for a vehicle that drives wheel units independently, including: n motor generators each coupled with a drive wheel unit and drivable independently from each other, n being a natural number of at least two; a drive circuit provided common to said n motor generators and configured to receive electric power from a power supply to drive said n motor generators; n switch circuits capable of electrically connecting/disconnecting said drive circuit and said n motor generators, respectively; and a control device controlling the drive circuit in accordance with how a vehicle is currently traveling, to selectively bring one or m of the n switch circuits into connection and also cause any of the motor generators associated with the one or m of the n switch circuits to together generate a driving force satisfying a driving force that the vehicle is required to output.

The present driving force control apparatus that adopts a configuration driving a plurality of motor generators by a common drive circuit can be reduced in size and weight, and cost. Furthermore, of the plurality of motor generators, one or at least two motor generators can be selected, as appropriate, as a motor generator(s) serving as a source(s) of driving force. Thus, whether the vehicle may be required to output large or small driving force, the selected motor generator(s) can be driven highly efficiently. As a result, the motor generators' total drive efficiency can be improved. Furthermore a motor generator that should not be driven can be selected from the plurality of motor generators in accordance with in which direction the vehicle is traveling. The vehicle can thus turn smoothly. This ensures that the vehicle can travel with stability.

Preferably, if the vehicle is required to output a relatively small driving force, the control device selectively brings one of the n switch circuits into connection, and if the vehicle is required to output a relatively large driving force, the control device selectively brings m of the n switch circuits into connection, m being a natural number of at least two and at most n.

The present driving force control apparatus allows one or at least two motor generators to be selected from a plurality of motor generators, as appropriate, as a motor generator(s) serving as a source(s) of driving force in accordance with the vehicle's required driving force. Thus, whether the required driving force may be large or small, the selected motor generator(s) can be driven highly efficiently. As a result, the motor generators' total drive efficiency can be improved.

Preferably the control device includes: a rotational speed detection unit detecting rotational speeds of the n motor generators; a required driving force detection unit detecting a required driving force that the vehicle requires; a driving force allocation determination unit selectively determining any of the n motor generators to be allocated the required driving force, as based on the rotational speeds and the required driving force, as detected, to maximize total drive efficiency of the n motor generators; and a connection switching unit selectively bringing into connection any of the n switch circuits associated with any of the motor generators selected.

The present driving force control apparatus allows a motor generator to be selected from a plurality of motor generators, as appropriate, as a motor generator serving as a source of driving force in accordance with the motor generators' rotational speed and the required driving force. Thus, whether the required driving force may be large or small, the selected motor generator can be driven highly efficiently. As a result, the motor generators' total drive efficiency can be improved.

Preferably, the control device further includes a steering angle detection unit detecting a steering angle of the vehicle, and if a decision is made from the steering angle as detected that the vehicle is traveling straight forward, the driving force allocation determination unit selectively determines any of the motor generators to be allocated the required driving force, as based on the rotational speeds and the required driving force.

The present driving force control apparatus allows a motor generator to be selected from a plurality of motor generators, as appropriate, as a motor generator serving as a source of driving force when the vehicle is traveling straight forward. This can ensure that the vehicle can travel with stability while the motor generators' total drive efficiency can be improved.

Preferably, if a decision is made from the steering angle as detected that the vehicle is turning, the driving force allocation determination unit selectively determines any of the motor generators to be allocated the required driving force, as based on in which direction the vehicle is turning.

The present driving force control apparatus when the vehicle is turning allows a motor generator that should not be driven to be selected from a plurality of motor generators, as appropriate, in accordance with in which direction the vehicle is turning. The vehicle can thus turn smoothly. This ensures that the vehicle can travel with stability.

The present invention that adopts a configuration driving a plurality of motor generators by a common drive circuit can provide a driving force control apparatus reduced in size and weight, and cost.

Furthermore in this configuration a motor generator can be selected from a plurality of motor generators, as appropriate, as a motor generator serving as a source of driving force in accordance with how the vehicle is currently traveling. Thus, whether the required driving force may be large or small, the selected motor generator can be driven highly efficiently. As a result, the motor generators' total drive efficiency can be improved.

Furthermore a motor generator that should not be driven can be selected from the plurality of motor generators, as appropriate, in accordance with in which direction the vehicle is traveling. The vehicle can thus turn smoothly. This ensures that the vehicle can travel with stability.

BEST MODES FOR CARRYING OUT THE INVENTION

Figure 1:
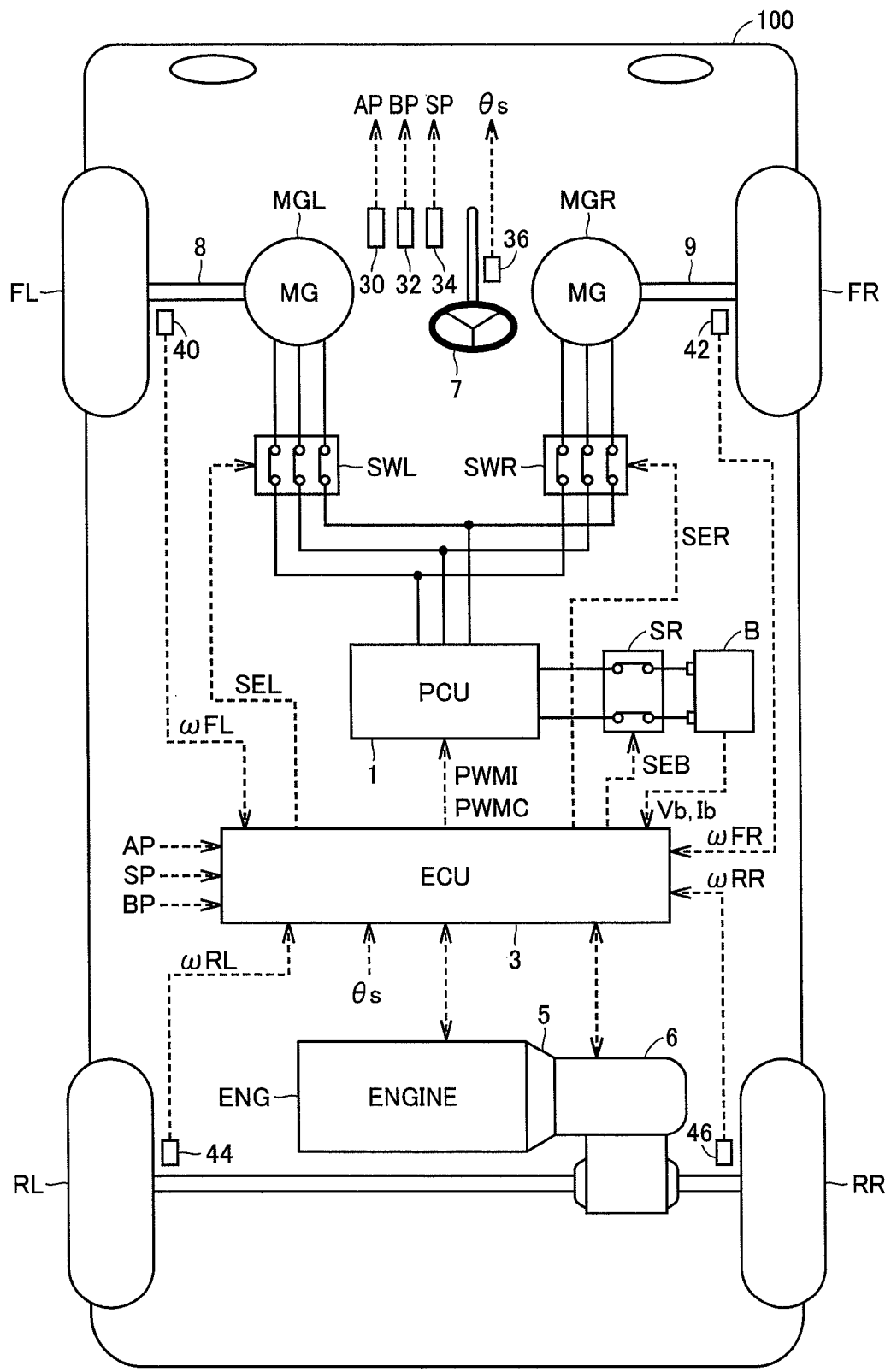
FIG. 1 is a schematic block diagram showing a drive system of a vehicle having mounted therein a driving force control apparatus for a vehicle that drives wheel units independently in an embodiment of the present invention.

Hereinafter, an embodiment of the present invention will now be described more specifically with reference to the drawings. In the figures, identical reference characters denote identical or like components.

FIG. 1 is a schematic block diagram showing a drive system of a vehicle having mounted therein a driving force control apparatus for a vehicle that drives wheel units independently in an embodiment of the present invention.

With reference to FIG. 1, vehicle 100 is for example a hybrid four wheel drive vehicle. The hybrid four wheel drive vehicle adopts a system driving two wheel units independently that drives left and right front wheel units FL, FR independently by motor generators MGL, MGR and left and right rear wheel units RL, RR by an engine ENG. Note that it can adopt a configuration driving left and right rear wheel units RL, RR by other than engine ENG, i.e., by engine ENG and a rear motor generator, or by a rear motor generator via a propeller shaft.

Furthermore, the hybrid four wheel drive vehicle may have a configuration other than the FIG. 1 configuration, i.e., have left and right front wheel units FL, FR driven by engine ENG (and/or a front motor generator) and left and right rear wheel units RL, RR driven independently by motor generators MGL, MGR. Alternatively, vehicle 100 may be an electric vehicle of a system driving two wheel units independently that drives either left and right front wheel units FL, FR or left and right rear wheel units RL, RR independently by motor generators MGL, MGR.

Vehicle 100 includes motor generators MGL, MGR, a power control unit (PCU) 1, an electrical control unit (ECU) 3, a battery B, a system relay SR, engine ENG, a transmission 5, a power generator 6, wheel units FL, FR, RL, RR, and a handle 7.

Motor generators MGL, MGR are coupled with shafts 8, 9 driving left and right front wheel units FL, FR, respectively, and respectively drive them independently. Motor generators MGL, MGR are 3-phase alternate current motors and for example are induction motors. As motor generators MGL, MGR, in-wheel motors incorporated inside their respective wheel units' wheels are adopted.

Engine ENG uses gasoline or similar fuel's combustion energy as a source to generate driving force, which is in turn divided to a path for transmission to power generator 6 generating direct current electric power and that for transmission via transmission 5 to the shafts driving left and right rear wheel units RL, RR. Power generator 6 is configured to be electrically connected through a power cable to battery B to be able to charge battery B.

Battery B is a nickel metal hydride battery, a lithium ion battery or a similar secondary battery, fuel cell or the like. Furthermore, battery B may be replaced with an electric power storage device implemented by an electric double layer capacitor or a similar capacitor of large capacitance. Between battery B and power control unit 1, system relay SR is disposed. System relay SR is controlled in response to a signal SEB issued from ECU 3 to be brought into/out of conduction.

Power control unit 1 is provided common to motor generators MGL, MGR and integrally controls driving motor generator MGL and driving motor generator MGR. This contributes to providing a drive system smaller in size and weight that that of a conventional vehicle driving wheel units independently that is provided with a power control unit for each of motor generators MGL, MGR. Power control unit 1 includes a single inverter provided common to motor generators MGL, MGR, and an upconverter converting voltage between the inverter and battery B, as will be described later.

Vehicle 100 also includes switch circuits SWL, SWR electrically connecting or disconnecting power control unit 1 and motor generators MGL, MGR, respectively.

Switch circuit SWL is brought into/out of conduction in response to a signal SEL issued from ECU 3 to electrically connect or disconnect power control unit 1 and motor generator MGL. Switch circuit SWR is brought into/out of conduction in response to a signal SER issued from ECU 3 to electrically connect or disconnect power control unit 1 and motor generator MGR. Switch circuits SWL, SWR are implemented for example by relays.

The present invention in an embodiment provides a driving force control apparatus that allows a plurality of motor generators MGL, MGR to be driven as controlled commonly by power control unit 1, and accordingly, switches bringing switch circuits SWL, SWR into/out of conduction to allow at least one of motor generators MGL, MGR to be selectively driven. Switch circuits SWL, SWR are switched by ECU 3, as appropriate, depending on how vehicle 100 is traveling, (i.e., how much driving force it requires, in which direction it travels, and the like), as will be described later. In other words, depending on how it travels, vehicle 100 will selectively perform traveling with at least two of wheel units FL, FR, RL, RR serving as driving wheel units and traveling with one of wheel units FL, FR, RL, RR serving as a driving wheel unit.

Vehicle 100 also includes an accelerator pedal position sensor 30 detecting an accelerator pedal position AP, a brake pedal position sensor 32 detecting a brake pedal position BP, a shift position sensor 34 detecting a shift position SP, a steering angle sensor 36 detecting a steering angle θs of handle 7. Vehicle 100 also includes wheel unit speed sensors 40, 42, 44, 46 detecting rotational speeds ωFL, ωFR, ωRL, ωRR of wheel units FL, FR, RL, RR. These sensors' detection signals are input to ECU 3.

ECU 3 is electrically connected to engine ENG, transmission 5, power control unit 1 and battery B and integrally controls how engine ENG should be operated, how motor generators MGR, MGL should be driven, and how battery B should be charged.

ECU 3 receives the detection signals from the variety of sensors, and from these detection signals detects how vehicle 100 is currently traveling, and in accordance with how vehicle 100 is currently traveling, as detected, ECU 1 generates signals SEL, SER for bringing switch circuits SWL, SVVR into/out of conduction, and outputs the signals to switch circuits SWL, SWR.

Furthermore, ECU 3 generates a signal PWMC for instructing the upconverter internal to power control unit 1 to upconvert or downconvert voltage and outputs the generated signal PWMC to the upconverter.

Furthermore, ECU 3 generates a signal PMWI instructing the inverter internal to power control unit 1 to convert a direct current voltage that is output from the upconverter into alternate current voltage for driving motor generator MGL and/or motor generator MGR for driving, and outputs the generated signal PWMI to the inverter. Furthermore, ECU 3 generates signal PMWI instructing the inverter to convert an alternate current voltage that is generated by motor generator MGL and/or motor generator MGR into direct current voltage, and return the direct current voltage to the upconverter for regeneration, and ECU 3 outputs the generated signal PWMI to the inverter.

Figure 2:
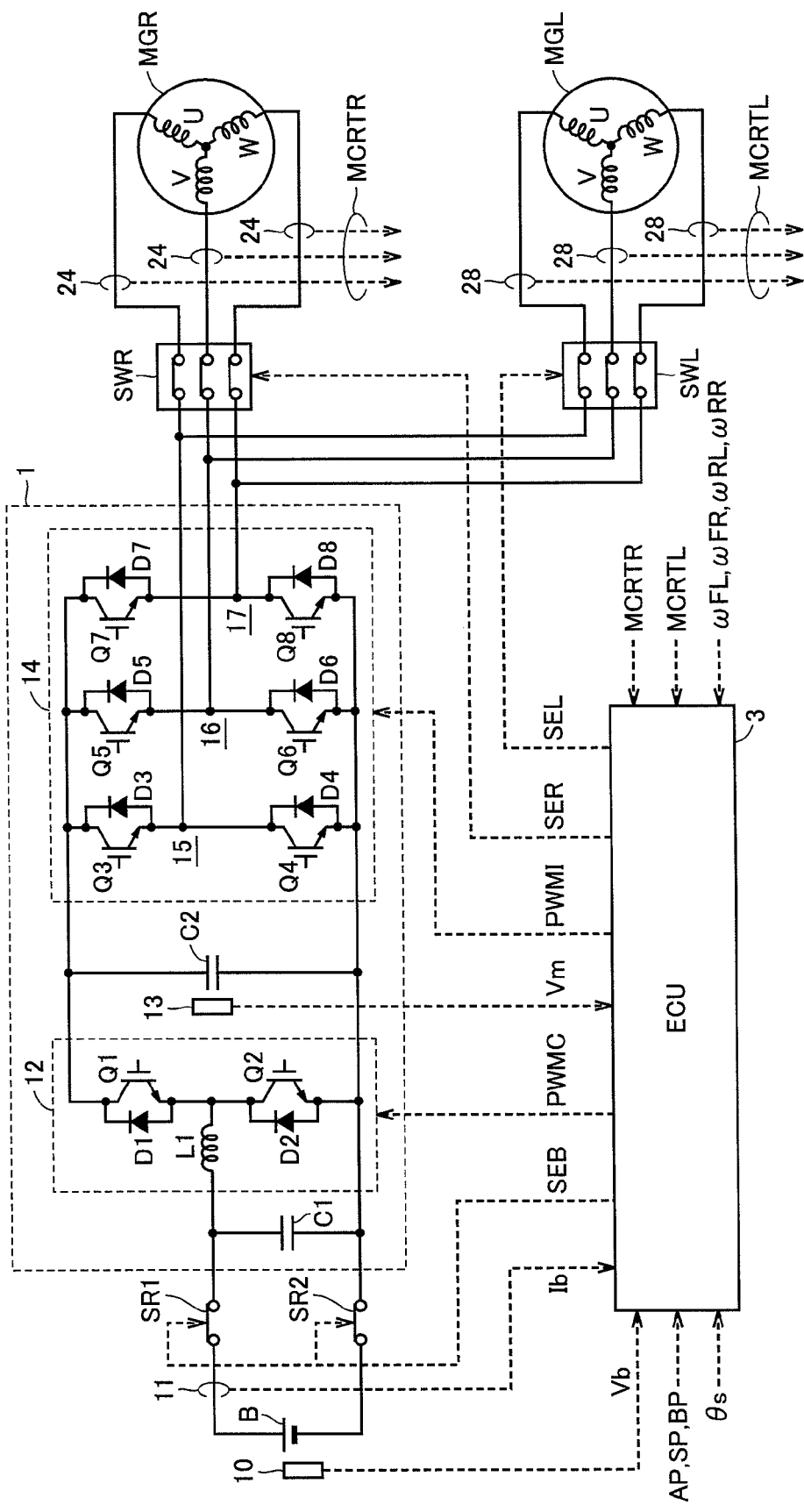
FIG. 2 is a schematic block diagram of a driving force control apparatus in the vehicle shown in FIG. 1.

FIG. 2 is a schematic block diagram of the driving force control apparatus in vehicle 100 shown in FIG. 1.

With reference to FIG. 2, the driving force control apparatus includes battery B, power control unit 1, motor generators MGR, MGL, system relays SR1, SR2, switch circuits SWR, SWL, ECU 3, voltage sensor 10, and current sensors 11, 24, 28.

Motor generators MGR, MGL are 3-phase alternate current motors (e.g., induction motors) and driven by electric power stored in battery B. Motor generator MGR's driving force is transmitted via a speed reducer to the shaft (not shown) driving right front wheel unit FR (not shown). Motor generator MGL's driving force is transmitted via a speed reducer to the shaft (not shown) driving left front wheel unit FL (not shown). Thus motor generators MGR, MGL assist engine ENG to cause vehicle 100 to travel, or cause vehicle 100 to travel by their driving forces alone.

Furthermore when vehicle 100 is regeneratively braked, motor generators MGR, MRL are rotated via the speed reducer by front wheel units FR, FL, respectively, to operate as power generators to regenerate power which in turn charges battery B via power control unit 1.

Power control unit 1 includes an inverter 14 provided common to motor generators MGR, MGL, an upconverter 12, smoothing capacitors C1, C2, and a voltage sensor 13.

Upconverter 12 includes a reactor L1, NPN transistors Q1, Q2, and diodes D1, D2. Reactor L1 has one end connected to a power supply line of battery B, and the other end connected to a point intermediate between NPN transistor Q1 and NPN transistor Q2, i.e., between the emitter of NPN transistor Q1 and the collector of NPN transistor Q2. NPN transistors Q1, Q2 are connected between a power supply line and an earth line in series. NPN transistor Q1 has its collector connected to the power supply line and NPN transistor Q2 has its emitter connected to the earth line. Furthermore, diode D1 is provided between the collector and emitter of NPN transistor Q1 to pass a current from the emitter to the collector, and diode D2 is provided between the collector and emitter of NPN transistor Q2 to pass a current from the emitter to the collector.

Inverter 14 is formed of a U phase arm 15, a V phase arm 16, and a W phase arm 17. U phase arm 15, V phase arm 16 and W phase arm 17 are provided between a power supply line and an earth line in parallel.

U phase arm 15 is formed of series connected NPN transistors Q3, Q4. V phase arm 16 is formed of series connected NPN transistors Q5, Q6. W phase arm 17 is formed of series connected NPN transistors Q7, Q8. Furthermore, a diode D3 is connected between the collector and emitter of NPN transistor Q3 to pass a current from the emitter to the collector. A diode D4 is connected between the collector and emitter of NPN transistor Q4 to pass a current from the emitter to the collector. A diode D5 is connected between the collector and emitter of NPN transistor Q5 to pass a current from the emitter to the collector. A diode D6 is connected between the collector and emitter of NPN transistor Q6 to pass a current from the emitter to the collector. A diode D7 is connected between the collector and emitter of NPN transistor Q7 to pass a current from the emitter to the collector. A diode D8 is connected between the collector and emitter of NPN transistor Q8 to pass a current from the emitter to the collector.

Each phase arm has an intermediate point connected to an end of a phase coil of motor generator MGR via switch circuit SWR. In other words, motor generator MGR has three U, V, W phase coils with their respective one ends connected commonly to a neutral point. The U phase coil has another end connected to a point intermediate between NPN transistors Q3, Q4. The V phase coil has another end connected to a point intermediate between NPN transistors Q5, Q6. The W phase coil has another end connected to a point intermediate between NPN transistors Q7, Q8.

Furthermore, each phase arm has an intermediate point connected to an end of a phase coil of motor generator MGL via switch circuit SWL. In other words, motor generator MGL has three U, V, W phase coils with their respective one ends connected commonly to a neutral point. The U phase coil has another end connected to a point intermediate between NPN transistors Q3, Q4. The V phase coil has another end connected to a point intermediate between NPN transistors Q5, Q6. The W phase coil has another end connected to a point intermediate between NPN transistors Q7, Q8.

Battery B is a nickel metal hydride, lithium ion, or similar secondary battery. Voltage sensor 10 detects a direct current voltage Vb output from battery B, and outputs the detected direct current voltage Vb to ECU 3. Current sensor 11 detects a direct current Ib flowing from battery B, and outputs the detected direct current Ib to ECU 3.

Capacitor C1 receives direct current voltage Vb from battery B, smoothes the received direct current voltage Vb and supplies the smoothed direct current voltage Vb to upconverter 12.

Upconverter 12 receives direct current voltage Vb from capacitor C1, upconverts the received direct current voltage, and supplies the upconverted direct current voltage to capacitor C2. More specifically, when upconverter 12 receives a signal PWMC from ECU 3, upconverter 12 upconverts direct current voltage Vb in accordance with a period for which NPN transistor Q2 is turned on by signal PWMC, and upconverter 12 supplies the upconverted direct current voltage Vb to capacitor C2.

Furthermore, when upconverter 12 receives signal PWMC from ECU 3, upconverter 12 downconverts direct current voltage supplied from inverter 14 via capacitor C2, and supplies the downconverted direct current voltage to charge battery B.

Capacitor C2 receives direct current voltage from upconverter 12, smoothes the received direct current voltage, and supplies the smoothed direct current voltage to inverter 14. Voltage sensor 20 detects a voltage across capacitor C2, i.e., a voltage Vm output from upconverter 12, which corresponds to a voltage input to inverter 14, and this will also be maintained hereinafter, and voltage sensor 20 outputs the detected voltage Vm to ECU 3.

When inverter 14 receives direct current voltage from battery B via capacitor C2, inverter 14 operates in response to a signal PWMI received from ECU 3 to convert the direct current voltage to alternate current voltage to drive motor generator MGR and/or motor generator MGL. Motor generator MGR and/or motor generator MGL are/is thus driven to generate torque in accordance with a required drive torque.

Furthermore, when vehicle 100 is regeneratively braked, inverter 14 converts alternate current voltage that is generated by motor generator MGR and/or motor generator MGL into direct current voltage in response to signal PWMI issued from ECU 3, and inverter 14 supplies the direct current voltage via capacitor C2 to upconverter 12. Note that regenerative braking as referred to herein includes: braking accompanied by power regeneration when a driver of vehicle 100 operates the foot brake; not operating the foot brake, while releasing the accelerator pedal while the vehicle is traveling, to reduce vehicular speed (or stop acceleration) while providing power regeneration; and the like.

Current sensor 24 detects a motor current MCRTR flowing to motor generator MGR and outputs the detected motor current MCRTR to ECU 3. Current sensor 28 detects a motor current MCRTL flowing to motor generator MGL and outputs the detected motor current MCRTL to ECU 3.

ECU 3 receives accelerator pedal position AP from accelerator pedal position sensor 30 (not shown), brake pedal position BP from brake pedal position sensor 32 (not shown), shift position SP from shift position sensor 34 (not shown), steering angle θs of handle 7 from steering angle sensor 36 (not shown), and rotational speeds ωFL, ωFR, ωRL, ωRR of wheel units FL, FR, RL, RR from wheel unit speed sensors 40, 42, 44, 46 (not shown). Furthermore, ECU 3 receives direct current voltage Vb from voltage sensor 10, voltage Vm output from upconverter 12 (i.e., the voltage input to inverter 14) from voltage sensor 13, motor current MCRTR from current sensor 24, and motor current MCRTL from current sensor 28.

ECU 3 calculates a drive torque that vehicle 100 is required to output (hereinafter also referred to as "required drive torque") based on accelerator pedal position AP, brake pedal position BP, shift position SP, and vehicular speed. The vehicular speed is for example an average value of rotational speeds ωFL, ωFR, ωRL, ωRR of wheel units FL, FR, RL, RR.

Subsequently from the calculated required drive torque ECU 3 calculates drive torques that the four wheel units FR, FL, RR, RL are respectively, individually required to output (hereinafter also referred to as "wheel units' respective, individually required drive torques"). The wheel units' respective, individually required drive torques are calculated for example by determining an allocation of drive torque among the four wheel units FR, FL, RR, RL, as based on rotational speeds ωFL, ωFR, ωRL, ωRR of wheel units FL, FR, RL, RR and steering angle θs of handle 7, and calculating the wheel units' respective, individually required drive torques from the determined allocation and a required drive torque.

In doing so for individual required drive torques that right front wheel unit FR and left front wheel unit FL driven independently by motor generators MGR and MGL are respectively, individually required to output, ECU 1 determines an allocation of drive torque among right front wheel unit FR and left front wheel unit FL by a method described later, as based on the sum of right and left front wheel units FR, FL's required drive torques and the rotational speeds of motor generators MGR, MGL, to maximize motor generators MGR and MGL's total drive efficiency.

Note that the motor generators' total drive efficiency means a ratio of a sum of the driving forces generated by motor generators MGR and MGL, respectively, (i.e., a drive torque multiplied by a number of revolutions) relative to a sum of the amounts of electric power supplied to motor generators MGR and MGL, respectively. In other words, maximizing the motor generators' total drive efficiency corresponds to minimizing a sum of the amounts of electric power supplied to the motor generators when a sum of the drive torques of the motor generators satisfies a drive torque that the left and right front wheel units are required to output.

Thus in an embodiment of the present invention when a required drive torque is to be output, and if a decision is made that driving both motor generators MGR and MGL, rather than driving only one of motor generators MGR and MGL, maximizes the motor generators' total drive efficiency, then an allocation of drive torque among right front wheel unit FR and left front wheel unit FL is determined to drive both motor generators MGR and MGL.

In contrast, if a decision is made that driving only one of motor generators MGR and MGL, rather than driving both motor generators MGR and MGL, maximizes the motor generators' total drive efficiency, then an allocation of drive torque among right front wheel unit FR and left front wheel unit FL is determined to drive only one of motor generators MGR and MGL.

If motor generators MGR and MGL are both driven, then ECU 3 generates signals SER, SEL for bringing switch circuits SWR, SWL both into conduction, and outputs the generated signals SER and SEL to circuits SWR and SWL, respectively. If one of motor generators MGR and MGL is driven, then ECU 3 generates signals SER, SEL for bringing into conduction one of switch circuits SWR and SWL that corresponds to a motor generator to be driven and for bringing the other one of switch circuits SWR and SWL out of conduction, and outputs the generated signals SER, SEL to circuits SWR, SWL, respectively.

Subsequently, ECU 3 employs a method described later to generate signal PWMI based on right and left front wheel units FR and FL's respective, individually required drive torques, as determined, for controlling NPN transistors Q3-Q8 of inverter 14 to switch them when inverter 14 drives motor generator MGR and/or motor generator MGL, and ECU 3 outputs the generated signal PWMI to inverter 14.

Furthermore, when inverter 14 drives motor generator MGR and/or motor generator MGL, ECU 3 employs a method described later to generate signal PWMC based on direct current voltage Vb and output voltage Vm for controlling NPN transistors Q1, Q2 of upconverter 12 to switch them, and ECU 3 outputs the generated signal PWMC to upconverter 12.

Furthermore, ECU 3 controls how engine ENG should be operated and the gear ratio of transmission 5 in accordance with right and left rear wheel units RR and RL's respective, individually required drive torques.

Figure 3:
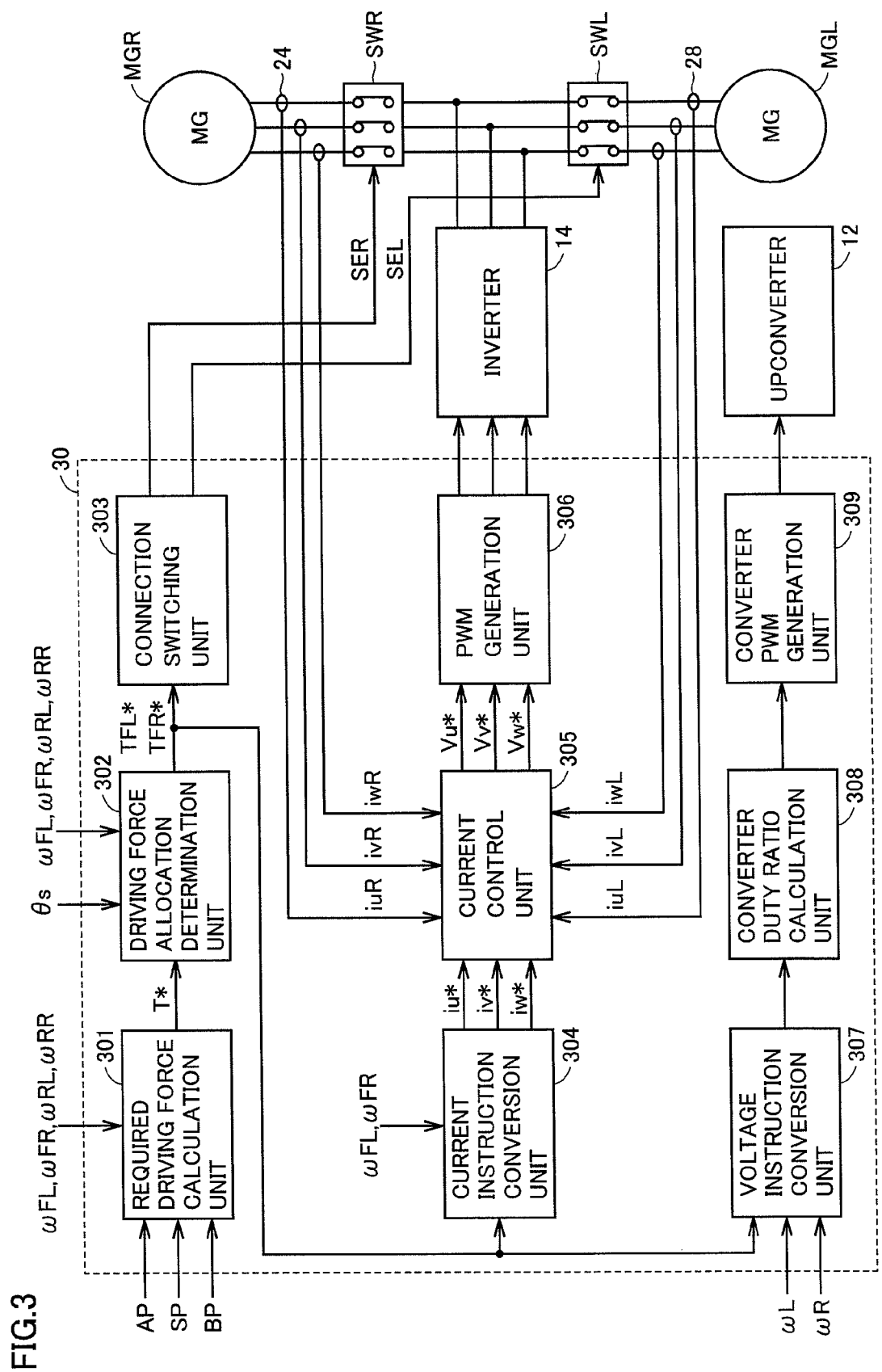
FIG. 3 is a block diagram of a function of an ECU shown in FIG. 2.

FIG. 3 is a block diagram of a function of ECU 3 in FIG. 2.

With reference to FIG. 3, ECU 3 includes a required vehicular driving force calculation unit 301, a driving force allocation determination unit 302, a connection switching unit 303, a current instruction conversion unit 304, a current control unit 305, a PWM generation unit 306, a voltage instruction conversion unit 307, a converter duty ratio calculation unit 308, and a converter PWM generation unit 309.

Required vehicular driving force calculation unit 301 calculates a required drive torque T* that vehicle 100 is required to output, as based on accelerator pedal position AP, brake pedal position BP, shift position SP and vehicular speed. The vehicular speed is for example an average value of rotational speeds ωFL, ωFR, ωRL, ωRR of wheel units FL, FR, RL, RR.

Driving force allocation determination unit 302 calculates from the calculated required drive torque T* the four wheel units FR, FL, RR, RL's respective, individually required drive torques TFR*, TFL*, TRR*, TRL*. This is done for example by determining an allocation of drive torque among the four wheel units FR, FL, RR, RL as based on rotational speeds ωFL, ωFR, ωRL, ωRR of wheel units FL, FR, RL, RR and steering angle θs of handle 7, and calculating the wheel units' respective, individually required drive torques from the determined allocation and required drive torque T*.

In doing so for individual required drive torques TFR*, TFL* that right front wheel unit FR and left front wheel unit FL driven independently by motor generators MGR and MGL are respectively, individually required to output, driving force allocation determination unit 302 determines an allocation of drive torque among right front wheel unit FR and left front wheel unit FL, as based a drive torque TF* that right and left front wheel units FR, FL as a whole are required to output and rotational speeds ωFR, ωFL of motor generators MGR and MGL, to maximize motor generators MGR and MGL's total drive efficiency.

More specifically, driving force allocation determination unit 302 compares efficiency of driving both motor generators MGR and MGL to output required drive torque TF* and that of driving only one of motor generators MGR and MGL to output required drive torque TF*, as based on a characteristic in efficiency of motor generators MGR, MGL.

Figure 4:
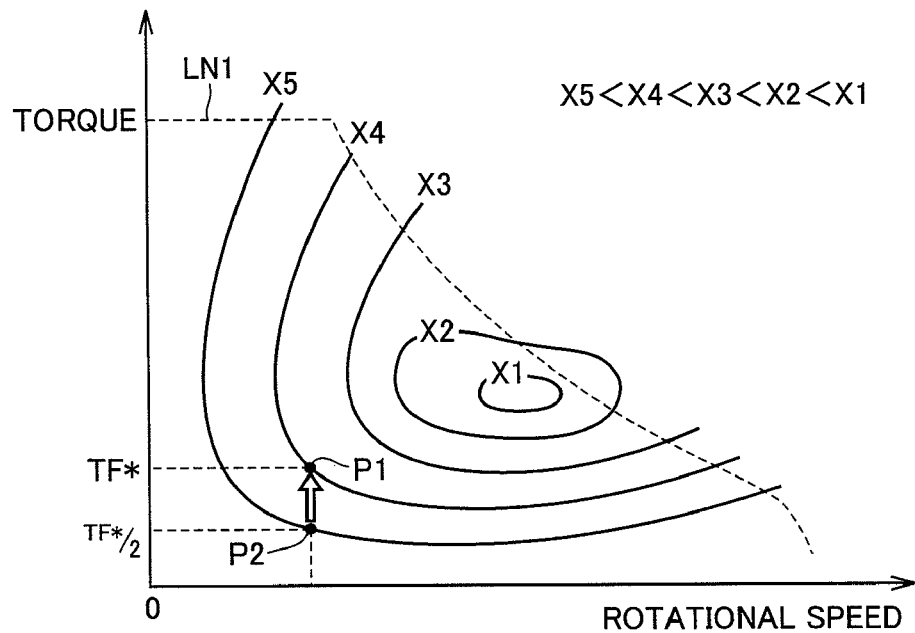
FIG. 4 shows a characteristic in efficiency of each of motor generators MGR, MGL.

FIG. 4 shows a characteristic in efficiency of each of motor generators MGR, MGL. In the figure, a curve LN1 indicates a relationship that motor generator MGR, MGL has between torque output and rotational speed. In FIG. 4, the efficiency is the highest at X1 and has a tendency to gradually decrease through X2, X3, X4, to the lowest at X5.

Herein, as one example, vehicle 100 travels with motor generators MGR, MGL both rotating at speed ω1, when the driver's operation requests right and left front wheel units FR, FL to output required drive torque TF* for the sake of illustration.

Required drive torque TF* and rotational speed ω1 are collated with the FIG. 4 characteristic in efficiency. If motor generators MGR, MGL are both driven to each output a torque TF*/2, the efficiency is X5, as indicated in the figure by a point P2. In contrast, if only one of motor generators MGR, MGL is driven to output torque TF*, then the efficiency increases to X4, as indicated in the figure by a point P1.

In other words, for relatively small required drive torque TF*, such as when traveling in an urban area at low speed, a decision is made that driving only one of motor generators MGR, MGL can maximize the motor generators' total drive efficiency. Accordingly, in this case, driving force allocation determination unit 302 determines right and left front wheel units FR, FL's respective, individually required drive torques TFR*, TFL* to cause one and the other of motor generators MGR, MGL to output torque TF* and a torque of zero, respectively.

Figure 5:
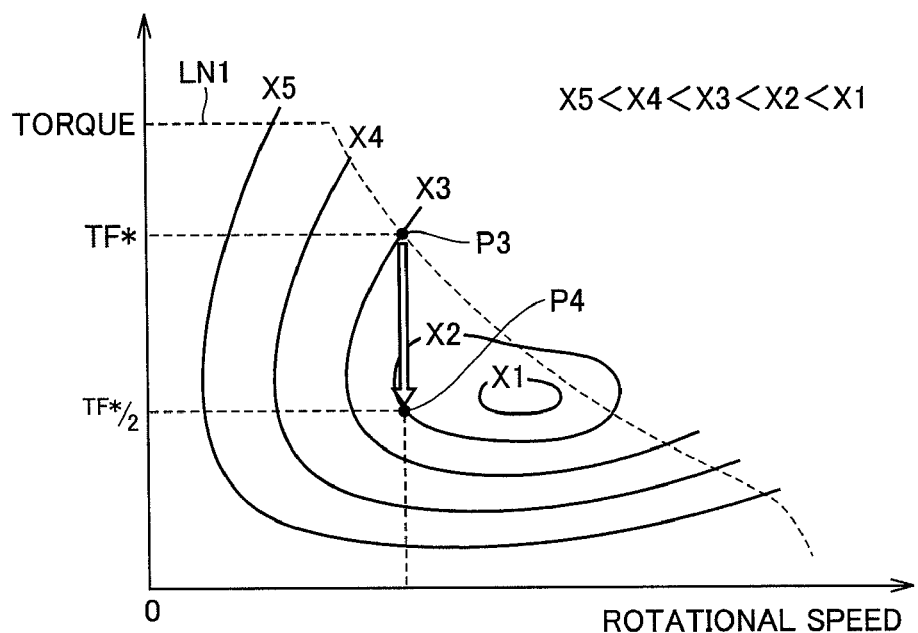
FIG. 5 shows a characteristic in efficiency of each of motor generators MGR, MGL.

In contrast, for relatively large required drive torque TF*, then, as shown in FIG. 5, it can be seen that when only one of motor generators MGR, MGL is driven to output torque TF*, efficiency X3 is obtained, as indicated by a point P3, and when motor generators MGR, MGL are both driven to each output torque TF*/2, then as indicated in the figure by a point P4, higher efficiency X2 is obtained.

Thus for relatively large required drive torque TF*, such as when accelerating while traveling at high speed, a decision is made that driving both motor generators MGR and MGL can increase the motor generators' total drive efficiency. In that case, driving force allocation determination unit 302 determines an allocation of drive torque among right front wheel unit FR and left front wheel unit FL as based on required drive torque TF* and rotational speeds ωFR, ωFL of motor generators MGR, MGL.

Thus, driving force allocation determination unit 302 selects a motor generator from a plurality of motor generators MGR, MGL that serves as a source of driving force, as appropriate, as based on required drive torque TF* and rotational speeds ωFR, ωFL of motor generators MGR, MGL. This allows a selected motor generator to be each driven highly efficiently, regardless of whether required driving force TF* may be large or small. As a result the vehicle as a whole can achieve increased total efficiency.

However, if vehicle 100 is turning, driving both motor generators MGR, MGL with right and left front wheel units FR, FL rotating at different speeds ωFR, ωFL results in the wheel units outputting torques with a difference attributed to the difference between their rotational speeds, resulting in vehicle 100 having an impaired reduced cornering ability.

Accordingly, if a decision is made from steering angle θs of handle 7 received from steering angle sensor 36 that vehicle 100 is currently turning, then driving force allocation determination unit 302 determines an allocation of drive torque among right front wheel unit FR and left front wheel unit FL, as based on in which direction the vehicle is turning, to drive one of motor generators MGR, MGL to allow vehicle 100 to turn smoothly.

More specifically, if a decision is made from steering angle θs of handle 7 that vehicle 100 is currently turning right, then, driving force allocation determination unit 302 determines an allocation of drive torque among right and left front wheel units FR, FL to drive only a wheel unit located outwardly of the direction in which the vehicle turns, i.e., left front wheel unit FL, and cause a wheel unit located inwardly of the direction in which the vehicle turns, i.e., right front wheel unit FR to be an idler.

Furthermore, if a decision is made from steering angle θs of handle 7 that vehicle 100 is currently turning left, then, driving force allocation determination unit 302 determines an allocation of drive torque among right and left front wheel units FR, FL to drive only a wheel unit located outwardly of the direction in which the vehicle turns, i.e., right front wheel unit FR, and cause a wheel unit located inwardly of the direction in which the vehicle turns, i.e., left front wheel unit FL to be an idler.

Then, driving force allocation determination unit 302 calculates the right and left front wheel units' respective, individually required drive torques TFR*, TFL* from the determined allocation and required drive torque TF*, and driving force allocation determination unit 302 outputs the wheel units' respective, individually required drive torques TFR*, TFL*, as calculated, to connection switching unit 303, current instruction conversion unit 304 and voltage instruction conversion unit 307.

Connection switching unit 303 receives the wheel units' respective, individually required drive torques TFR*, TFL* from driving force allocation determination unit 302, and connection switching unit 303 generates signals SER, SEL based thereon for bringing switch circuits SWR, SWL into/out of conduction, and outputs the signals to switch circuits SWR, SWL, respectively.

More specifically, if neither one of the wheel units' respective, individually required drive torques TFR*, TFL* is zero, i.e., if motor generators MGR, MGL are both driven, then connection switching unit 303 generates signals SER, SEL for bringing both switch circuits SWR and SWL into conduction, and outputs the generated signals SER, SEL to switch circuits SWR, SWL, respectively. Thus motor generators MGR, MGL are each electrically connected to inverter 14, and a motor driving current will be applied to each phase coil from inverter 14.

In contrast, if one of the wheel units' respective, individually required drive torques TFR*, TFL* is zero, i.e., if only one of motor generators MGR, MGL is driven, then connection switching unit 303 generates signals SER, SEL for bringing into conduction one switch circuit SWR (or SWL) corresponding to a motor generator to be driven, and for bringing the other switch circuit SWL (or SWR) out of conduction, and outputs the generated signals SER, SEL to circuits SWR, SWL, respectively. Thus only one of motor generators MGR, MGL is electrically connected to inverter 14, and a motor driving current is applied to each phase coil. As the other of motor generators MGR, MGL is electrically disconnected to inverter 14, applying a motor driving current will be ceased.

Note that if only one of motor generators MGR, MGL is driven, continuously driving one motor generator may be replaced with driving motor generators MGR, MGL alternately for each predetermined period of time. This can be done by bringing switch circuits SWR, SWL into conduction alternately for each predetermined period of time.

Thus inverter 14 and motor generators MGR, MGL are electrically connected/disconnected as based on the wheel units' respective, individually required drive torques TFR*, TFL*, and subsequently inverter 14 is controlled to cause motor generators MGR, MGL to output torque in accordance with the wheel units' respective, individually required drive torques TFR*, TFL* as determined.

More specifically, current instruction conversion unit 304 calculates a primary current value (corresponding to a sum of a current for excitation and that for torque) that is a target to be controlled for performing vector control, and a slip current frequency, as based on the wheel units' respective, individually required drive torques TFR*, TFL* as determined, and rotational speeds ωFR, ωFL of motor generators MGR, MGL. Such calculation is done in accordance with a well known vector control system. Then, from the calculated primary current value and slip angle frequency, current instruction conversion unit 304 calculates current instructions iu*, iv*, iw* for the phases of motor generator MGR and/or motor generator MGL, and outputs the calculated current instructions iu*, iv*, iw* to current control unit 305.

Note that the series of calculations that is done for driving both motor generators MGR, MGL uses an average value of rotational speeds ωFR, ωFL of motor generators MGR, MGL. If only one of motor generators MGR, MGL is driven, rotational speed ωFR or ωFL of one of the motor generators that is driven is used.

Current control unit 305 receives current instructions iu*, iv*, iw* for the three phases from current instruction conversion unit 304 and receives motor currents MCRTR, MCRTL from current sensors 24, 28. Current control unit 305 performs feedback control so that the three phases' current detection values iu, iv, iw indicated in motor current MCRTR and/or motor current MCRTL match the three phases' current instructions iu*, iv*, iw*. More specifically, current control unit 305 calculates amounts of voltage to be controlled Vu*, Vv*, Vw* for adjusting a motor current, for a deviation between current detection values iu, iv, iw and current instructions iu*, iv*, iw*, and outputs the calculated amounts of voltage to be controlled Vu*, Vv*, Vw* to PWM generation unit 306.

PWM generation unit 306 receives the amounts of voltage to be controlled Vu, Vv, Vw from current control unit 305, and voltage Vm from voltage sensor 13, and generates signal PWMI as based thereon and outputs the generated signal PWMI to inverter 14.

Thus inverter 14 has each transistors Q3 to Q8 controlled in accordance with signal PWMI received from PWM generation unit 306 to switch to control a current passed to each phase of motor generators MGR, MGL to allow motor generators MGR, MGL to output the wheel units' respective, individually required drive torques TR*, TL*, as designated.

Thus a motor driving current is controlled and motor generators MGR, MGL output torques designated in the wheel units' respective, individually required drive torques TFR*, TFL*.

Note that if one of the wheel units' respective, individually required drive torques TFR*, TFL* is zero, e.g., if TFR*=0, then the motor generator MGR associated therewith and inverter 14 are electrically disconnected by switch circuit SWR, and applying a motor driving current to motor generator MGR is ceased. As a result, right front wheel unit FR coupled with motor generator MGR is an idler.

Furthermore, in parallel with thus controlling a motor driving current, when a voltage required to drive motor generator MGR and/or motor generator MGL, i.e., a motor driving voltage is determined from the wheel unit respective, individually required drive torques TFR*, TFL* as determined and rotational speeds ωFR, ωFL of motor generators MGR, MGL, ECU 1 controls a voltage conversion operation of upconverter 12 so that voltage Vm input to inverter 14 matches the determined motor driving voltage.

More specifically, voltage instruction conversion unit 307 determines an optimal (or target) value for a voltage input to the inverter, i.e., a voltage instruction value Vdc_com for upconverter 12, as based on the wheel units' respective, individually required drive torques TR*, TL* received from driving force allocation determination unit 302 and rotational speeds ωFR, ωFL of motor generators MGR, MGL, and outputs the determined voltage instruction value Vdc_com to converter duty ratio calculation unit 308.

When converter duty ratio calculation unit 308 receives voltage instruction value Vdc_com from voltage instruction conversion unit 307, and direct current voltage Vb from voltage sensor 10, converter duty ratio calculation unit 308 calculates a duty ratio from direct current voltage Vb for setting voltage Vm input to inverter 14 at voltage instruction value Vdc_com. Converter duty ratio calculation unit 308 outputs the calculated duty ratio to converter PWM generation unit 309.

Converter PWM generation unit 309 uses the duty ratio received from converter duty ratio calculation unit 308 to generate signal PWMC for turning on/off NPN transistors Q1, Q2 of upconverter 12 and outputs the generated signal PWMC to upconverter 12.

Figure 6:
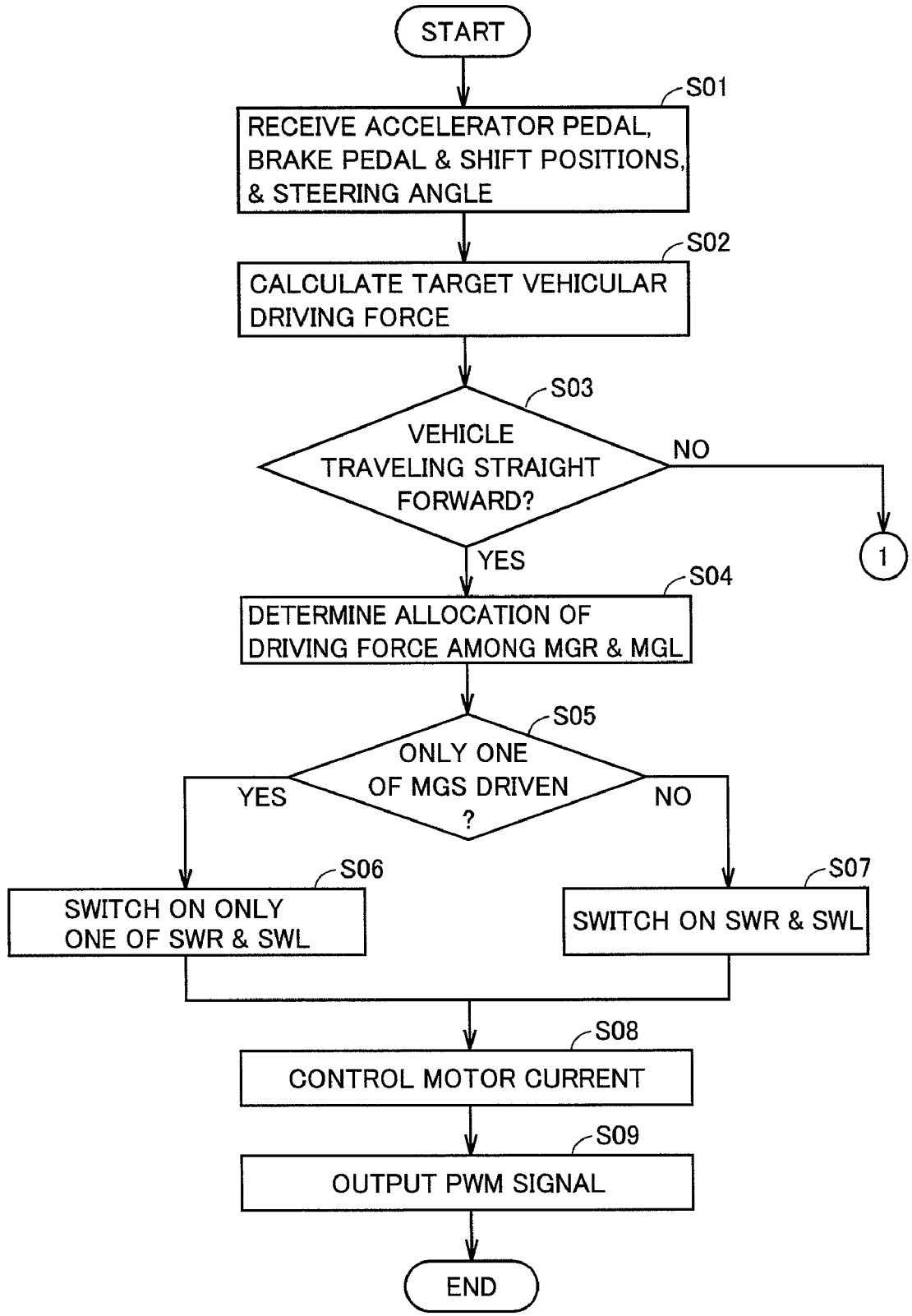
FIG. 6 is a flowchart for illustrating controlling a driving force of a vehicle that drives wheel units independently in an embodiment of the present invention.
Figure 7:
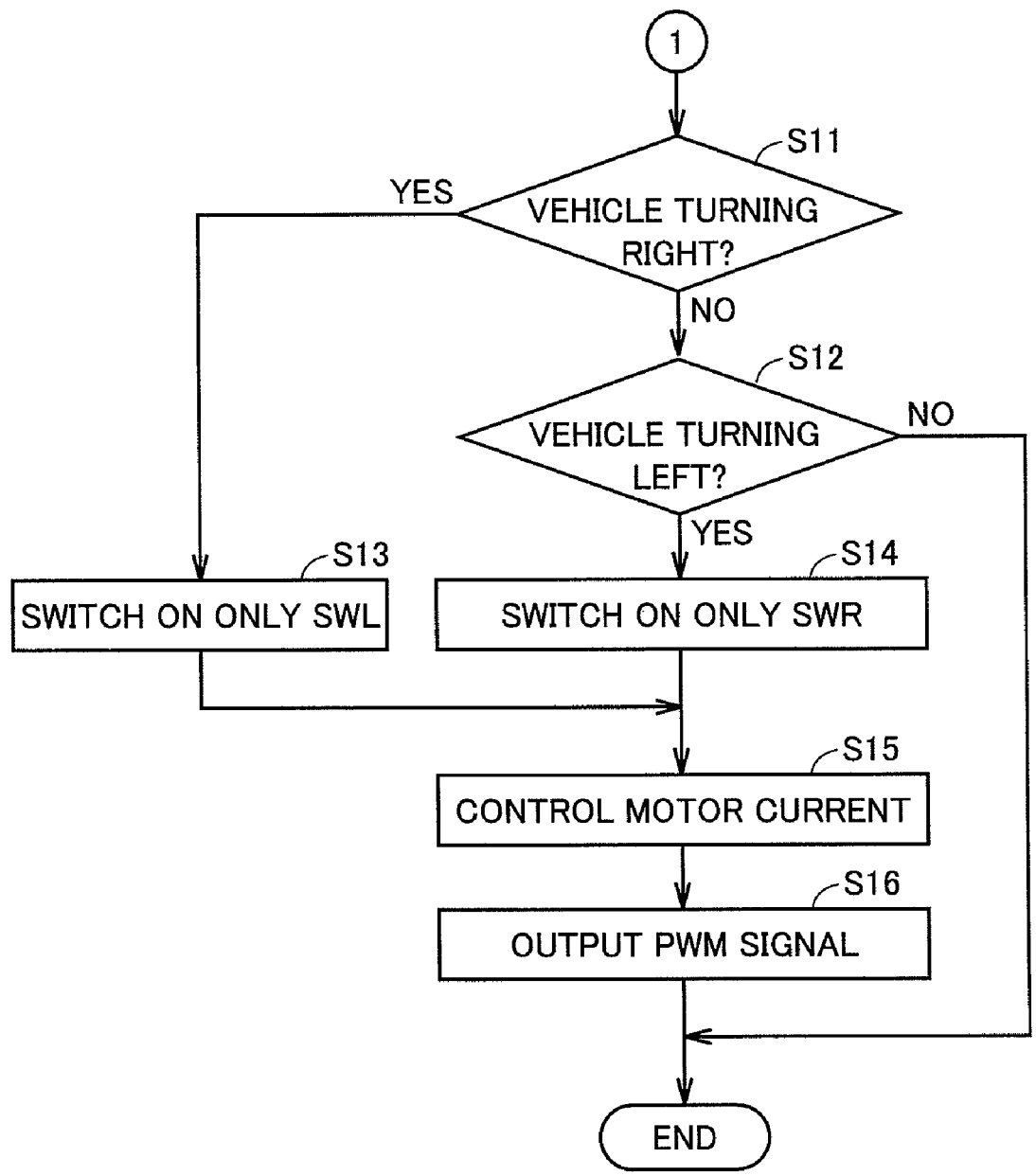
FIG. 7 is a flowchart for illustrating controlling a driving force of a vehicle that drives wheel units independently in an embodiment of the present invention.

FIGS. 6 and 7 are a flowchart for illustrating controlling a driving force of a vehicle that drives wheel units independently in an embodiment of the present invention.

With reference to FIG. 6, initially, information of an operation performed by a driver, such as accelerator pedal position AP, shift position SP, brake pedal position BP and steering angle θs, is input from the variety of sensors to ECU 3 (step S01), and required vehicular driving force calculation unit 301 uses these sensors' inputs to calculate required drive torque T* that vehicle 100 is required to output (step S02).

Then, driving force allocation determination unit 302 determines an allocation of a driving force among for right front wheel unit FR and left front wheel unit FL, as based on drive torque TF* of the calculated required drive torque T* that right and left front wheel units FR, FL as a whole are required to output, rotational speeds ωFR, ωFL of motor generators MGR, MGL, and steering angle θs of handle 7.

More specifically, initially, driving force allocation determination unit 302 determines from steering angle θs of handle 7 as received from steering angle sensor 36 whether vehicle 100 is traveling straight forward (step S02). If steering angle θs has at most a predetermined value, driving force allocation determination unit 302 determines that vehicle 100 is traveling straight forward, and goes to step S04. If steering angle θs exceeds the predetermined value, then driving force allocation determination unit 302 determines that vehicle 100 is turning, and goes to step S11 shown in FIG. 7 described later.

Then at step S03 if a decision is made that vehicle 100 is traveling straight forward, driving force allocation determination unit 302 determines an allocation of drive torque among right front wheel unit FR and left front wheel unit FL, as based on required drive torque T* and the rotational speeds of motor generators MGR, MGL, to maximize motor generators MGR and MGL's total drive efficiency (step S04).

More specifically, driving force allocation determination unit 302 has previously stored therein as a map the characteristic in efficiency of motor generators MGR, MGL shown in FIG. 4 (a relationship between torque output, rotational speed and efficiency) and refers to this map to determine an allocation of drive torque that maximizes the motor generators' total drive efficiency. Driving force allocation determination unit 302 then uses the determined allocation and required drive torque T* to calculate the wheel units' respective, individually required drive torques TFR*, TFL*.

Once the wheel units' respective, individually required drive torques TFR*, TFL* have been calculated, then connection switching unit 303 calculates signals SER, SEL based thereon for bringing switch circuits SWR, SWL into/out of conduction, and outputs the signals to switch circuits SWR, SWL, respectively.

More specifically, if at step S05 one of the wheel units' respective, individually required drive torques TFR*, TFL* is positive or negative and the other is zero then connection switching unit 303 determines to drive only one of motor generators MGR, MGL, and connection switching unit 303 generates signals SER, SEL for bringing into conduction one of switch circuits SWR and SWL that corresponds to the motor generator to be driven, and bringing the other switch circuit out of conduction, and connection switching unit 303 outputs the generated signals to switch circuits SWR, SWL (step S06).

If at step S05 the wheel units' respective, individually required drive torques TFR*, TFL* are both positive or negative, then connection switching unit 303 determines to drive both motor generators MGR and MGL. In that case, connection switching unit 303 generates signals SER, SEL for bringing both switch circuits SWR and SWL into conduction and outputs the signals to switch circuits SWR, SWL (step S07).

Thus at least one of motor generators MGR, MGL is electrically connected to inverter 14, and in that condition, inverter 14 controls a motor driving current (step S08). Inverter 14 has each NPN transistor Q3 to Q8 controlled in response to signal PWMI output from PWM generation unit 306 to switch to allow motor generators MGR, MGL to output torques in accordance with the wheel units' respective, individually required drive torques TFR*, TFL* (step S09).

Thus when vehicle 100 is traveling straight forward, a motor generator of a plurality of motor generators MGR, MGL that serves as a source of driving force is selected, as appropriate, as based on required drive torque TF* and rotational speeds ωFR, ωFL of motor generators MGR, MGL. Thus the motor generators' total drive efficiency can be maximized.

In contrast, referring again back to step S03, if a decision is made that vehicle 100 is turning, then in accordance with the FIG. 7 flowchart, one of motor generators MGR, MGL is selected as a source of driving force, as appropriate, depending on in which direction vehicle 100 is turning.

More specifically, in FIG. 6 at step S03 if steering angle θs of handle 7 has an absolute value exceeding a predetermined value, then furthermore from whether steering angle θs is positive or negative a decision is made on whether vehicle 100 is turning right (step S11).

If at step S11 a decision is made that vehicle 100 is turning right then an allocation of drive torque is determined to cause only a wheel unit located outwardly of the turn, i.e., only left front wheel unit FL to serve as a driving wheel unit, and a wheel unit located inwardly of the turn, i.e., right front wheel unit FR to serve as an idler wheel unit.

More specifically, if the vehicle is turning right, left front wheel unit FL's individually required drive torque TFL* is set to be required drive torque TF* and right front wheel unit FR's individually required drive torque TFR* is set to be zero. Accordingly, connection switching unit 303 generates signals SER, SEL, as based on the wheel units' respective, individually required drive torques TFR*, TFL* as set, for bringing switch circuit SWR and switch circuit SWL out of and into conduction, respectively (step S13).

If at step S11 a decision is made that vehicle 100 is not turning right then driving force allocation determination unit 302 further determines whether vehicle 100 is turning left (step S12). If so, an allocation of drive torque is determined, in contrast to that applied when vehicle 100 is turning right, to cause only right front wheel unit FR to serve as a driving wheel unit, and left front wheel unit FL to serve as an idler wheel unit.

More specifically, when the vehicle is turning left, left front wheel unit FL's individually required drive torque TFL* is set at zero and right front wheel unit FR's individually required drive torque TFR* is set to be required drive torque TF*. Accordingly, connection switching unit 303 generates signals SER, SEL based on the wheel units' respective, individually required drive torques TFR*, TFL*, as set, for bringing switch circuit SWR and switch circuit SWL into and out of conduction, respectively (step S14).

Thus one of motor generators MGR, MGL and inverter 14 are electrically connected, and in that condition, inverter 14 controls a motor driving current (step S15). Inverter 14 thus has NPN transistors Q3 to Q8 controlled in response to signal PWMI to switch to allow motor generators MGR, MGL to output torques in accordance with the wheel units' respective, individually required drive torques TFR*, TFL* (step S16).

Thus when vehicle 100 is turning, driving a motor generator coupled with a wheel unit located inwardly of a direction in which the vehicle turning is ceased. This allows vehicle 100 to turn smoothly to ensure that the vehicle can travel with stability.

Furthermore the motor generators' total drive efficiency can be higher than that of a conventional electric vehicle that controls slip velocity, as based on right and left induction motors' difference in rotational speed, to allow the induction motors to generate equal torques.

Exemplary Variation

Figure 8:
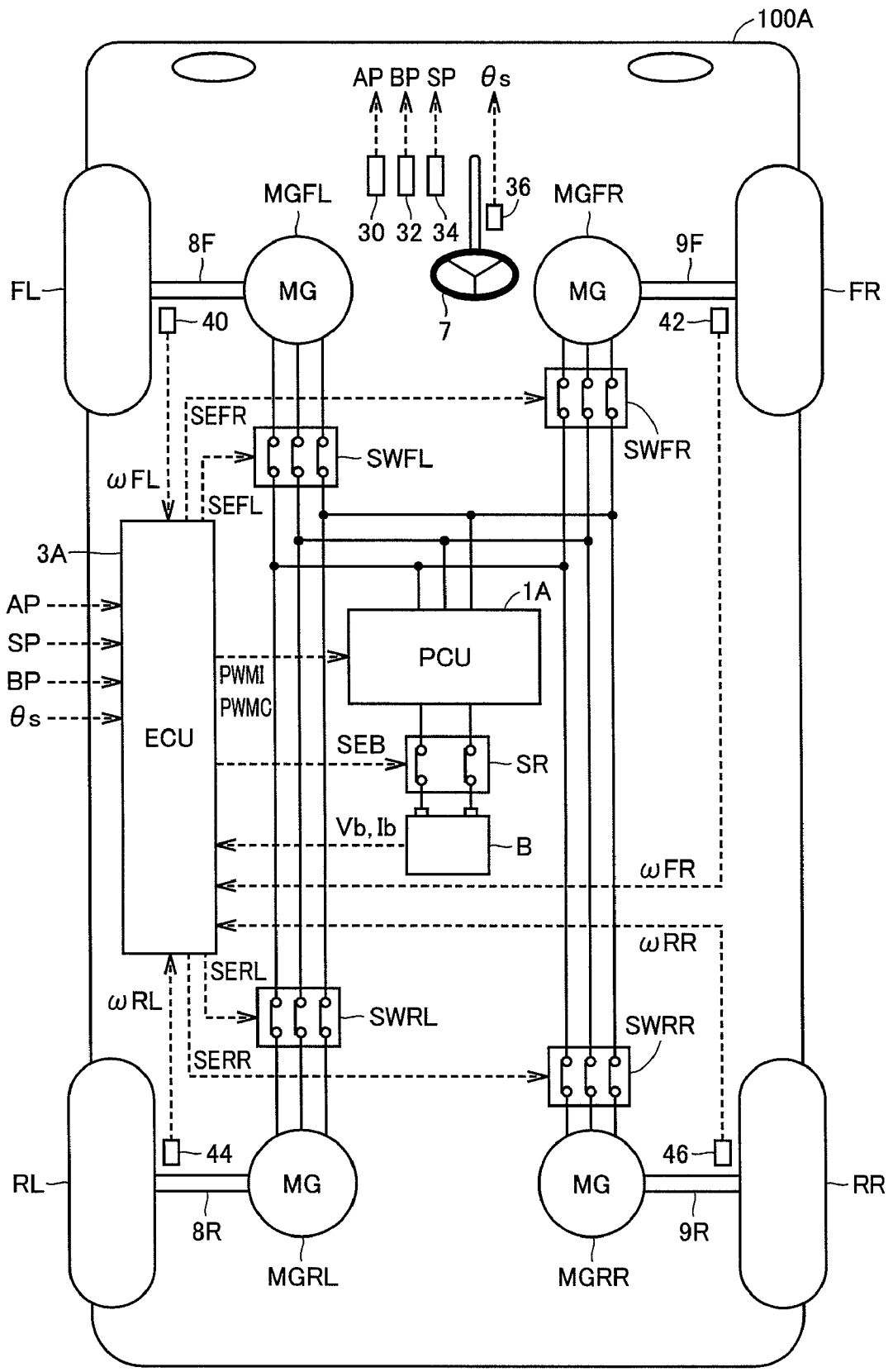
FIG. 8 is a schematic block diagram showing a drive system of a vehicle having mounted therein a driving force control apparatus for a vehicle that drives wheel units independently in an exemplary variation of an embodiment of the present invention.

The present invention in an embodiment provides a driving force control apparatus for a vehicle that drives wheel units independently, that is also applicable to a vehicle 100A of a system driving four wheel units independently as shown in FIG. 8, as well as vehicle 100 driving two wheel units independently as shown in FIG. 1.

More specifically, with reference to FIG. 8, vehicle 100A adopts a system driving four wheel units independently that drives left and right front wheel units FL, FR independently by motor generators MGFL, MGFR and left and right rear wheel units RL, RR independently by motor generators MGRL, MGRR.

A single power control unit 1A is provided for the four motor generators MGFL, MGFR, MGRL, MGRR commonly. Power control unit 1 integrally controls driving the four motor generators MGFL, MGFR, MGRL, MGRR. Power control unit 1A is basically the same in configuration as the FIG. 1 power control unit 1.

Furthermore, vehicle 100A includes four switch circuits SWFL, SWFR, SWRL, SWRR for electrically connecting or disconnecting power control unit 1A and motor generators MGFL, MGFR, MGRL, MGRR, respectively. As well as the FIG. 1 switch circuits SWR, SWL, the four switch circuits SWFL, SWFR, SWRL, SWRR are brought into/out of conduction in response to signals SEFL, SEFR, SERL, SERR issued from an ECU 3A.

The FIG. 8 driving force control apparatus is characterized in comparison with the FIG. 1 driving force control apparatus by switching bringing the four switch circuits SWFL, SWFR, SWRL, SWRR into/out of conduction to allow the four motor generators MGFL, MGFR, MGRL, MGRR to be selectively driven. The four switch circuits SWFL, SWFR, SWRL, SWRR are switched by a method similar to that of the FIG. 1 driving force control apparatus, as appropriate, depending on how vehicle 100A is currently traveling (i.e., a required driving force, and a direction in which the vehicle is traveling). More specifically, an allocation of drive torque among wheel units FR, FL, RR, RL is determined, as based on a driving force that vehicle 100A is required to output and the rotational speeds of motor generators MGFL, MGFR, MGRL, MGRR, to maximize the four motor generators MGFL, MGFR, MGRL, MGRR's total drive efficiency.

Furthermore when vehicle 100A is turning, an allocation of drive torque among wheel units FR, FL, RR, RL is determined to cause a wheel unit located most inwardly of the direction in which the vehicle is turning to be an idler.

In accordance with the determined allocation, the wheel units' respective, individually required drive torques are calculated, and in accordance therewith, switch circuits SWFL, SWFR, SWRL, SWRR are selectively brought into conduction. Thus vehicle 100A makes a selection from traveling with a single wheel unit serving as a driving wheel unit to traveling with a maximum of four wheel units serving as driving wheel units.

Thus the present invention in an embodiment adopts a configuration allowing a plurality of motor generators to be driven by a single drive circuit. This can provide a driving force control apparatus reduced in size and weight, and cost.

Furthermore in the present configuration one or at least two of a plurality of motor generators can be selected as a motor generator/motor generators that serves/serve as a source/sources of driving force, as appropriate, in accordance with how the vehicle is currently traveling. The motor generators selected can thus be driven efficiently, regardless of whether how much driving force is required. As a result the vehicle as a whole can achieve increased total efficiency.

Furthermore, of the plurality of motor generators, a motor generator that should not be driven can be selected as appropriate in accordance with in which direction the vehicle is traveling. The vehicle can thus turn smoothly, and this can ensure that the vehicle can travel with stability.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a driving force control apparatus mounted in a vehicle that drives wheel units independently.

The invention claimed is:

1. A driving force control apparatus for a vehicle that drives wheel units independently, comprising:
   n motor generators each coupled with a drive wheel unit and drivable independently from each other, n being a natural number of at least two;
   a drive circuit provided common to said n motor generators and configured to receive electric power from a power supply to drive said n motor generators; and
   a switch mechanism for selectively switching in accordance with a required driving force that said vehicle requires, rotational speeds of said n motor generators and a steering angle of said vehicle, a state with one of said n motor generators and said drive circuit connected together and a state with m of said n motor generators and said drive circuit connected together, m being a natural number of at least two and at most n,
   wherein said drive circuit comprises an inverter configured to drive all of said n motor generators.

2. A driving force control apparatus for a vehicle that drives wheel units independently, comprising:
   n motor generators each coupled with a drive wheel unit and drivable independently from each other, n being a natural number of at least two;
   a drive circuit provided common to said n motor generators and configured to receive electric power from a power supply to drive said n motor generators; and
   a control device controlling said drive circuit in accordance with a required driving force that said vehicle requires, rotational speeds of said n motor generators and a steering angle of said vehicle, said control device including:
      first drive means for driving m of said n motor generators by said drive circuit, m being a natural number of at least two and at most n; and
      second drive means for driving one of said n motor generators by said drive circuit,
   wherein said drive circuit comprises an inverter configured to drive all of said n motor generators.

3. A driving force control apparatus for a vehicle that drives wheel units independently, comprising:
   n motor generators each coupled with a drive wheel unit and drivable independently from each other, n being a natural number of at least two;
   a drive circuit provided common to said n motor generators and configured to receive electric power from a power supply to drive said n motor generators;

n switch circuits capable of electrically connecting/disconnecting said drive circuit and said n motor generators, respectively; and a control device controlling said drive circuit in accordance with a required driving force that said vehicle requires, rotational speeds of said n motor generators and a steering angle of said vehicle, to selectively bring one or m of said n switch circuits into connection and also cause any of said motor generators associated with said one or m of said n switch circuits to together generate a driving force satisfying said required driving force, wherein said drive circuit comprises an inverter configured to drive all of said n motor generators.

4. The driving force control apparatus for a vehicle that drives wheel units independently, according to claim 3, wherein if said vehicle is required to output a relatively small driving force, said control device selectively brings one of said n switch circuits into connection, and if said vehicle is required to output a relatively large driving force, said control device selectively brings m of said n switch circuits into connection, m being a natural number of at least two and at most n.

5. The driving force control apparatus for a vehicle that drives wheel units independently, according to claim 4, wherein said control device includes:

a rotational speed detection unit detecting said rotational speeds of said n motor generators;

a required driving force detection unit detecting said required driving force;

a driving force allocation determination unit selectively determining any of said n motor generators to be allocated said required driving force, as based on said rotational speeds and said required driving force, as detected, to maximize total drive efficiency of said n motor generators; and a connection switching unit selectively bringing into connection any of said n switch circuits associated with said any of said motor generators selected.

6. The driving force control apparatus for a vehicle that drives wheel units independently, according to claim 5, wherein:

said control device further includes a steering angle detection unit detecting said steering angle of said vehicle; and if a decision is made from said steering angle as detected that said vehicle is traveling straight forward, said driving force allocation determination unit selectively determines said any of said motor generators to be allocated said required driving force, as based on said rotational speeds and said required driving force.

7. The driving force control apparatus for a vehicle that drives wheel units independently, according to claim 6, wherein if a decision is made from said steering angle as detected that said vehicle is turning, said driving force allocation determination unit selectively determines said any of said motor generators to be allocated said required driving force, as based on in which direction said vehicle is turning.

* * * * *